Dec. 19, 1939.  C. E. CARLSEN  2,184,114
PIPE CUTTER WITH A REMOVABLE HANDLE
Filed Sept. 9, 1938
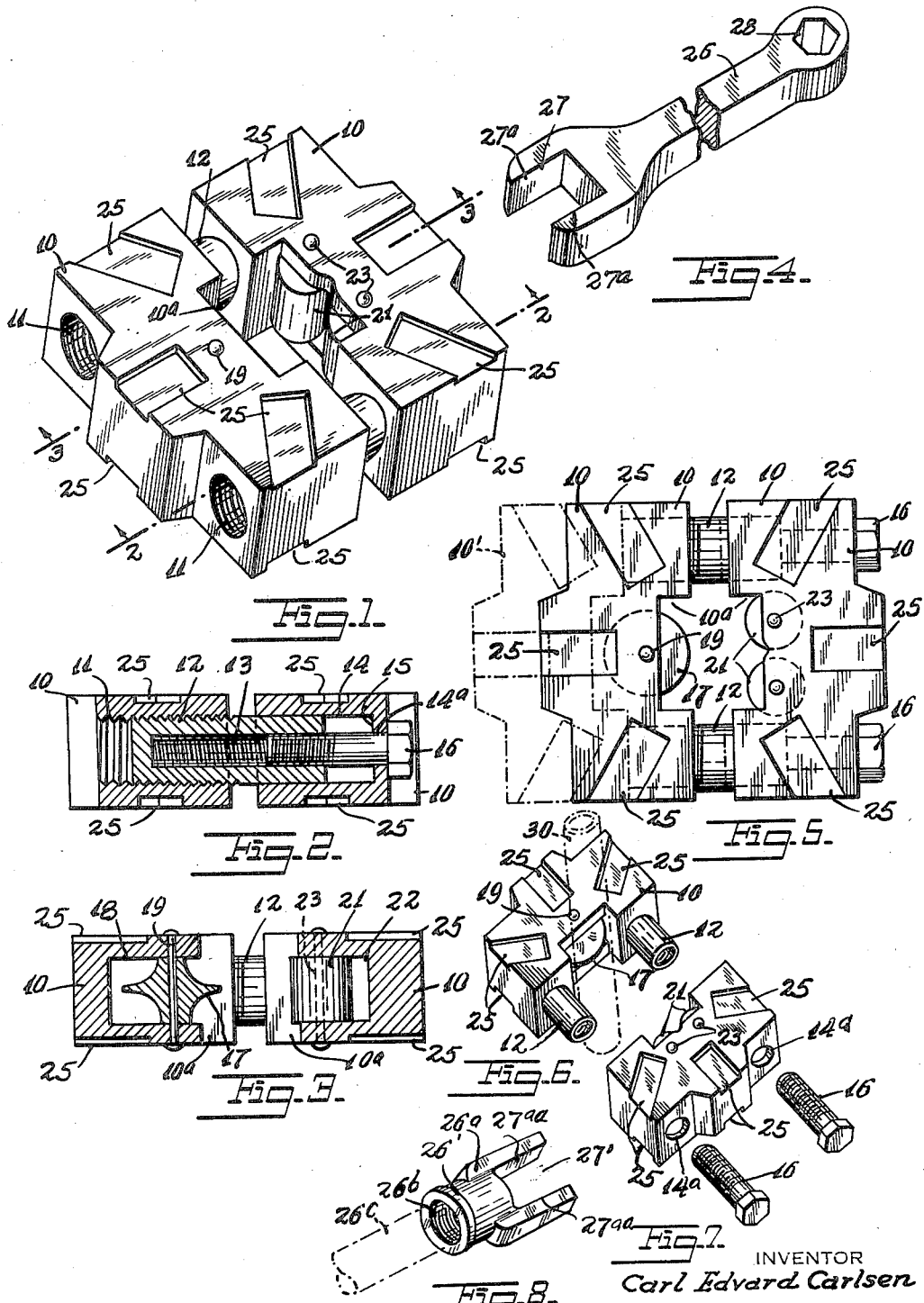
INVENTOR
Carl Edvard Carlsen
BY
ATTORNEY Patented Dec. 19, 1939

2,184,114

UNITED STATES PATENT OFFICE 2,184,114

PIPE CUTTER WITH A REMOVABLE HANDLE

Carl Edvard Carlsen, New York, N. Y.

Application September 9, 1938, Serial No. 229,079

2 Claims. (Cl. 30—96)

This invention relates to new and useful improvements in a pipe cutter with a removable handle.

More specifically, it is proposed to construct a pipe cutter for use in cutting pipes, and which is provided with a removable handle engageable upon recesses formed on the faces of the cutter for turning the same.

Another object of this invention is the provision of a pair of flat members on their adjacent edges with inwardly extending recesses for permitting the flat members to be engaged across the sides of a pipe for substantially encircling the same.

Still further it is proposed to provide a means for adjustably connecting together the said flat members so that they may be extended with relation to each other to accommodate pipes of different diameters.

Still further it is proposed to provide a cutter mounted on one of the members, and a pair of guide rollers mounted on the other of the members for resting against the pipe to hold the flat members in a position substantially at right angles to said pipe to permit said cutter to operate efficiently.

Still further it is proposed to provide a plurality of pairs of recesses on the faces of the flat members and around their sides and upon which a jaw handle may be selectively engaged for permitting the pipe cutter to be turned upon the pipe for cutting the same.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a pipe cutter constructed in accordance with this invention.

Fig. 2 is a sectional view taken on the line 2—2 of Fig. 1.

Fig. 3 is a sectional view on the line 3—3 of Fig. 1.

Fig. 4 is a perspective view of the jaw handle per se.

Fig. 5 is a plan view of a pipe cutter.

Fig. 6 is a perspective view of one of the flat metallic members.

Fig. 7 is a perspective view of the other of the metallic members.

Fig. 8 is a perspective view of another jaw handle tool.

The pipe cutter with removable handles, according to this invention, includes a pair of flat metallic members 10 for engaging across opposite sides of a pipe for substantially encircling the same. The flat members 10 are substantially rectangular in shape and their adjacent edges are formed with inwardly extending cutout portions 10ª which are adapted to engage around a pipe positioned between the adjacent sides thereof. A means is provided for adjustably connecting the members 10 together.

This means comprises threaded openings 11 formed in one of the members 10 and into which studs 12 are threadedly engaged. Each stud 12 has a threaded opening 13 formed inwards from one end thereof and the other end thereof is normally closed (see Fig. 2). The open end of the studs 12 extends from the inner ends of the openings 11 and slidably engages into openings 14 extended inwards from the inner edge of the other flat member 10. The outer end of the openings 14 continue into reduced openings 14ª forming shoulders 15 against which the open end of the stud 12 is adapted to abut. Bolts 16 pass through the reduced openings 14ª and threadedly engage into the openings 13 formed in the studs 12. When the bolts 16 are turned the studs 12 will be drawn into the openings 14 for moving the members 10 together to decrease the space between the adjacent edges thereof. When the bolts 16 are moved in a direction to loosen its holding effect the members 10 may be manually drawn apart as illustrated by the dot and dash line 10' in Fig. 5 for increasing the space between the adjacent sides of the members 10.

A cutter 17 for cutting the pipe is mounted on one of the members 10. This cutter is mounted within an inwardly extending recess 18 formed in one of the members and continuing inwards from one of the cutouts 10ª. A pin 19 is engaged through the member 10 and freely passes through the cutter 17 for rotatively supporting the same.

A pair of guide rollers 21 for resting against the opposite side of the pipe are mounted on the other of the members 10. These guide rollers 21 are constructed of lengths of tubular metal mounted within a recess 22 formed in the member 10 and continuing inwards from the cutout 10ª. Each of the rollers 21 is mounted on a pin 23 extending through the said member. The rollers 21 are tubular in formation so as to solidly engage against the pipe to maintain the pipe cutter rigidly in position upon the pipe to prevent a rocking movement to destroy the effects of the cutter 17.

A plurality of pairs of recesses are formed on the faces of the flat members 10 and around their sides for selective engagement by a jaw handle. The recesses 25 are arranged around the pipe cutter in such a manner that the jaw handle may be easily engaged thereon in any of the tilted positions of the cutter for permitting the cutter to be rotated upon the pipe for cutting the same. The jaw handle 26 is characterized by a length of metal being formed at one of its ends with an inwardly extending cutout portion 27 adapted to be engaged over the edges of the members 10 with the sides 27$^a$ of the cutout engaging the faces of the recess 25. The other end of the jaw handle 26 is formed with a bolt wrench opening 28$^c$ which is adapted to be engaged on the bolt 16 for rotating the same to adjust the spacing of the members 10 as previously described.

The operation of this device is as follows:

The flat metallic members 10 are separated by disengaging the screws 16 from the threaded openings 13 formed in the studs 12. The member 10 having the studs 12 is engaged behind a pipe illustrated by the dot and dash lines 30 in Fig. 6, and the member 10 having the rollers 21 is engaged upon the opposite side of the pipe 30 by slipping the studs 12 into the openings 14. The bolts 16 are passed through the reduced openings 14$^a$ formed in one of the rectangular members 10 and threadedly engaged into the openings 13 formed in the studs 12 to tightly engage the rollers 21 and the cutter 17 upon opposite sides of the pipe 30. The cutter is then in position for cutting the pipe 30, which is accomplished by engaging the cutout portion 27 of the jaw handle 26 upon a superimposed pair of the recesses 25 with the sides 27$^a$ of the cutout engaging the faces of the recesses so that as pressure is applied to the body handle 26 the pipe cutter will be rotated around the pipe to cause the cutter 17 to cut the pipe.

In Fig. 8 a modification of the body handle 26' is shown which consists of a head 26$^a$ having a threaded opening 26$^b$ into which lengths of pipe material 26$^c$ may be threadedly engaged for acting as a handle for the head 26$^a$. The head 26$^a$ is formed with a cutout 27' which is adapted to be engaged over the edge of the pipe cutter with its faces 27$^{aa}$ engaging the faces of the recesses 25 formed in the members 10 forming the pipe cutter.

While I have illustrated and described the preferred embodiments of my invention, it is to be understood that I do not limit myself to the precise constructions herein disclosed and the right is reserved to all changes and modifications coming within the scope of the invention, as defined in the appended claims.

Having thus described my invention, what I claim as new, and desire to secure by United States Letters Patent is:

1. A pipe cutter comprising a pair of substantially flat, metallic members engageable, respectively, on opposite sides of a pipe, each of said members having a hollow central portion for accommodating a part of rotatable pipe-engaging apparatus and having bores extending from end to end immediately inward from the side edges thereof, adjusting means in said bores for adjustably holding said members together, said members formed with a plurality of pairs of opposed recesses in their upper and lower faces extending inwardly from the side and end edges thereof and embracing the bores whereby an open-faced wrench may successively be engaged in said pairs of recesses for rotating said cutter.

2. A pipe cutter comprising a pair of substantially flat, metallic members engageable, respectively, on opposite sides of a pipe, each of said members having a hollow central portion for accommodating a part of rotatable pipe-engaging apparatus and having borings extending from end to end immediately inward from the side edges thereof, threads in the borings of one of said members, a pair of sleeves externally threaded at one end for threaded engagement, respectively, in the threaded borings and slidingly engageable in the borings of the other member, threads on the inner side of said sleeve, and a pair of threaded bolts, threadedly engageable with the threads on the inner sides of said bolts, respectively, the heads of which are engageable with the said other member, said members formed with a plurality of pairs of opposed recesses in their upper and lower faces extending inwardly from the side and end edges thereof and embracing the borings whereby an open-faced wrench may successively be engaged in said pair of recesses for rotating said cutter.

CARL EDVARD CARLSEN.